United States Patent

Yamamoto

[19]

[11] Patent Number: 6,008,952
[45] Date of Patent: Dec. 28, 1999

[54] ZOOM LENS SYSTEM

[75] Inventor: Chikara Yamamoto, Saitama, Japan

[73] Assignee: Fuji Photo Optical Co., Ltd., Saitama, Japan

[21] Appl. No.: 09/045,715

[22] Filed: Mar. 23, 1998

[30] Foreign Application Priority Data

Mar. 24, 1997 [JP] Japan .................................. 9-090105

[51] Int. Cl.⁶ ................................................ G02B 15/14
[52] U.S. Cl. ........................................................ 359/683
[58] Field of Search .................... 359/676, 683, 359/686

[56] References Cited

U.S. PATENT DOCUMENTS 5,668,668  9/1997  Shibayama et al. ................... 359/683
5,805,350  9/1998  Yamamoto ............................. 359/686

*Primary Examiner*—Scott J. Sugarman
*Attorney, Agent, or Firm*—Young & Thompson

[57] ABSTRACT

A zoom lens comprises, in order from the image magnifying side to the image reducing side, a negative power first lens group which is moved axially for focusing a lens system of the zoom lens and fixed during zooming the lens system, a positive power second lens group, a positive power third lens group and a negative power fourth lens group which are moved axially relative to each other and relative to the first lens group and a fifth lens group which has a positive power and remains fixed during focusing and zooming the lens system, the zoom lens satisfying the following conditions:

$-2.0 < F_1/F < -0.9$

$0.9 < F_2/F < 1.5$

$1.5 < F_3/F < 5.0$ $0.8 < F_5/F < 1.5$ where F is the overall focal length of the zoom lens at the wide angle end, and $F_1$, $F_2$, $F_3$ and $F_5$ are the focal lengths of the first, second, third and fifth lens groups, respectively.

9 Claims, 11 Drawing Sheets

FIG. 5
TELEPHOTO END

FIG. 6

FIG. 7 INTERMEDIATE POSITION

FIG. 8

FIG. 9 WIDE-ANGLE END

FIG. 10

ZOOM LENS SYSTEM

BACKGROUND OF THE INVENTION

1. Field of the Invention

This invention relates to a zoom lens system for use with imaging device, such as a charge coupled device (CCD) and an image pick-up tube, a photographic camera using a silver film, and a projection type television set.

2. Description of Related Art

There have been known zoom lens systems of the type including a negative power first lens group, a positive power second lens group, a negative power third lens group and a positive power fourth lens group. The first lens group is movable axially for focusing the zoom lens system and, however, remains fixed during zooming the zoom lens system. The fourth lens group is stationary. During zooming the zoom lens system, the second and third lens groups are moved axially relative to each other and relative to the first and fourth. One of such zoom lens systems known from, for example, Japanese Unexamined Patent Publication No. 5-297276 has been designed for the purpose of forming an image on a small size of imaging device such as a CCD.

In recent years, projection type television sets with liquid crystal display means installed therein have received much attention. If the zoom lens described above is used as a projection lens of such a projection type television set, the zoom lens does indeed become bulky with an increase in image size, which is always undesirable in view of strong demands for miniaturization of the projection type television set. Further, if a zoom lens is used as a projection lens, it is generally hard for the zoom lens to sufficiently reduce aggravation of distortion. In particular, if a zoom projection lens is applied to the projection type television set, from the standpoint of preventing aggravation of occurrence of irregular color and a quantitative light loss which are caused depending upon lighting systems, the zoom projection lens is desired to be of a telecentric type which makes a principal ray parallel to its optical axis at a side on which an image is reduced. The prior art zoom lens is not of the telecentric type. Further, the prior zoom lens has only a back focal length too short to admit a color separation optical element in an appropriate axial position.

SUMMARY OF THE INVENTION

It is accordingly an object of the invention to provide a zoom lens which maintains compactness of the lens system over a range of zooming.

It is another object of the invention to provide a zoom lens, aberrations of which are well balanced and which causes only a significantly reduced change in aberration due to zooming.

It is another object of the invention to provide a zoom lens which has an appropriate back focal length and yields decreased axial movement for zooming the lens system.

The foregoing objects of the invention are accomplished by providing a zoom lens having five lens groups, namely in order from the image magnifying side a negative power first lens group G1, a positive power second lens group G2, a positive power third lens group G3, a negative power fourth lens group G4 and a positive power fifth lens group G5. The first lens group G1 is moved axially for focusing the optical system and, however, remains fixed during zooming the optical system. The three lens groups, second to fourth lens groups G2 to G4, are moved relative to each other and relative to the stationary lens group G5.

The zoom lens may be provided with a diaphragm disposed between the second and third lens groups G2 and G3 which is preferably moved together with either the second lens group G2 or the third lens group G3 during zooming the lens system.

The zoom lens must satisfy the following conditions:

$-2.0 < F_1/F < -0.9 \ldots$ (I)

$0.9 < F_2/F < 1.5 \ldots$ (II)

$1.5 < F_3/F < 5.0 \ldots$ (III)

$0.8 < F_5/F < 1.5 \ldots$ (IV)

where F is the overall focal length of the zoom lens at the wide angle end, and $F_1$, $F_2$, $F_3$ and $F_5$ are the focal lengths of the first, second, third and fifth lens groups, respectively.

The parameters (I)–(IV) set forth yield the distribution of power necessary for suitably balancing the aberrations of the lens system over the range of zooming. The first condition (I) defines the power of the first lens group G1. If the under limits is exceeded, the first lens group G1 weakens its negative power, which causes an increase in axial movement of the first lens group G1 for focusing the lens system with an effect of increasing a change in aberration. On the other hand, the upper limit is exceeded, the lens group G intensifies its negative power, which causes an increase in the height from axis of exit rays which is too large to make a correction for aberrations, in particular aspherical aberration and distortion. The second condition (II) defines the power of the second lens group G2. If the under limit is exceeded, the second lens group G2 intensifies its positive power, placing it more difficult to make a correct for aberrations. If the upper limit is exceeded, the second lens group G2 weakens its positive power, causing an increase in axial movement for zooming the lens system, which is always undesirable for compactness of the lens system. The third condition (III) defines the power of the third lens group G3. If the under limit is exceeded, the third lens group G3 intensifies its positive power, placing it difficult to make a correction for aberrations. On the other hand, if the upper limit is exceeded, the second third group G3 weakens its positive power, causing an increase in axial movement for zooming the lens system, which is always undesirable for compactness of the lens system. The fourth condition (IV) defines the power of the fifth lens group G5. If the under limit is exceeded, the fifth lens group G5 intensifies its positive power, shortening the back focal length of the lens system and placing it difficult to make the lens system telecentric on the side of image reduction. On the other hand, if the upper limit is exceeded, the fifth lens group weakens its positive power, elongating the back focal length of the lens system and causing an increase in the height from axis of exit rays which is too large to make a correction for aberrations. The second and third lens groups G2 and G3 are preferably designed and adapted to decrease an axial distance therebetween as the lens system is zoomed out. For meeting the demand, the second and third lens groups G2 and G3 must satisfy the following conditions:

$0.1 < D_2/F < 0.5 \ldots$ (V)

$0.08 < \delta D_2/F < 0.3 \ldots$ (VI)

where $D_2$ is the axial distance between the second and third lens groups of the zoom lens at the wide-angle end and $\delta D_2$ is the absolute value of a change in the axial distance between the second and third lens groups during zooming the lens system from the wide-angle end to the telephoto end.

The parameters (V) and (VI) set forth are necessary for compactness of the lens system over a range of zooming as well as well balanced aberrations. If the under limit is exceeded, it is hard to significantly reduce aggravation of the balance of aberrations, and in particular aggravation of distortion. On the other hand, if the upper limit is exceeded, it is hard to maintain compactness of the lens system. If the under limit of the condition (VI) is exceeded, a change in the axial distance between the second and third lens groups G2 and G3 during zooming is decreased, which burdens the second and third lens groups G2 and G3 with an increased axial movement during zooming. On the other hand, if the upper limit is exceeded, it is hard to prevent a change in aberration due to zooming.

Further, the third lens group G3 may comprise a positive power lens element and a negative power lens element, which may be separated or cemented and preferably satisfies the following condition:

$$\underline{v}(-) < 30. \ldots \text{(VII)}$$

where $\underline{v}(-)$ is the dispersion of the negative power lens element as measured by the Abbe number.

The parameter (VII) prevents or significantly reduces aggravation of lateral chromatic aberration.

BRIEF DESCRIPTION OF THE DRAWINGS

The above and other objects and features of the present invention will be understood from the following description of a specific embodiment thereof when considering in conjunction with the accompanying drawings, in which.

DETAILED DESCRIPTION OF THE SPECIFIC EMBODIMENT

In the following description the term "image magnifying side" shall mean and refer to the side on which the zoom lens projects a magnified image, and the term "image reducing side" shall mean and refer to the side on which the zoom lens projects a reduced image.

Figure 1:
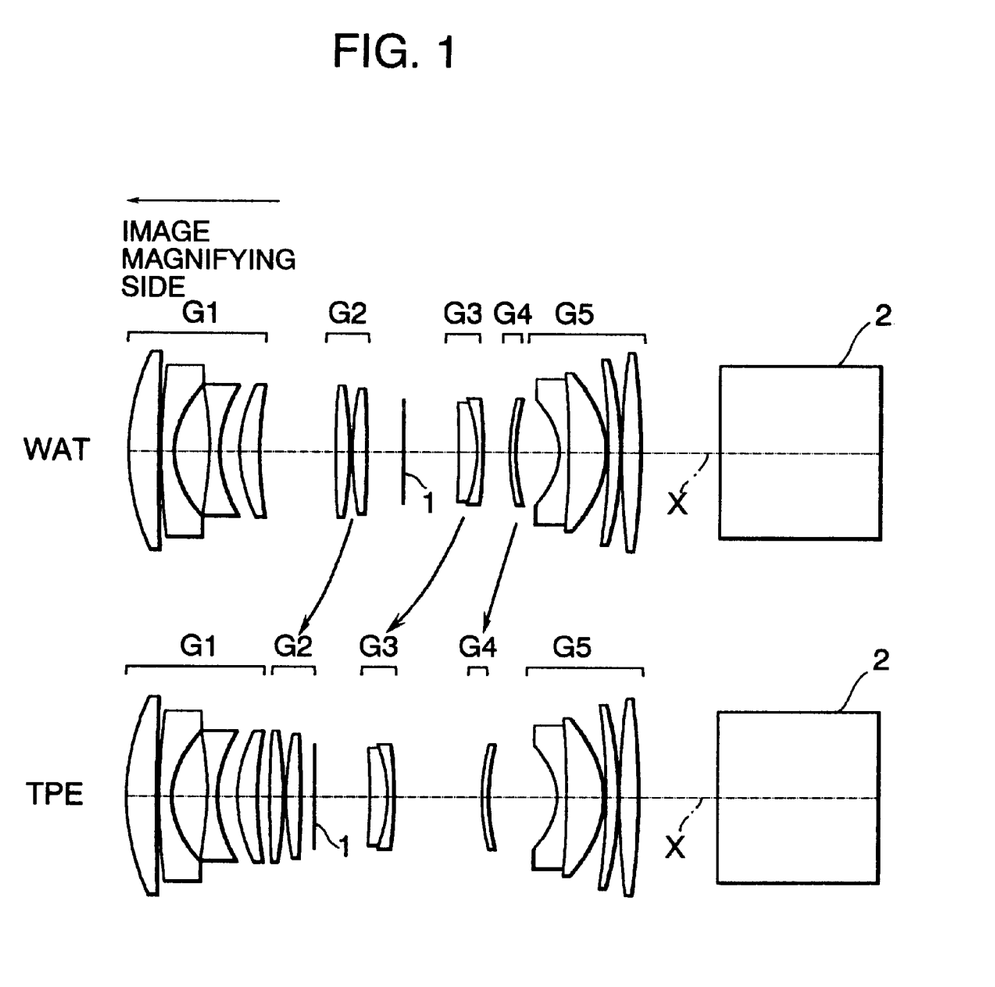
FIG. 1 is a schematic diagrammatic side view of a basic optical structure of a zoom lens at wide-angle end and telephoto end in accordance with a first embodiment of the invention.
Figure 2:
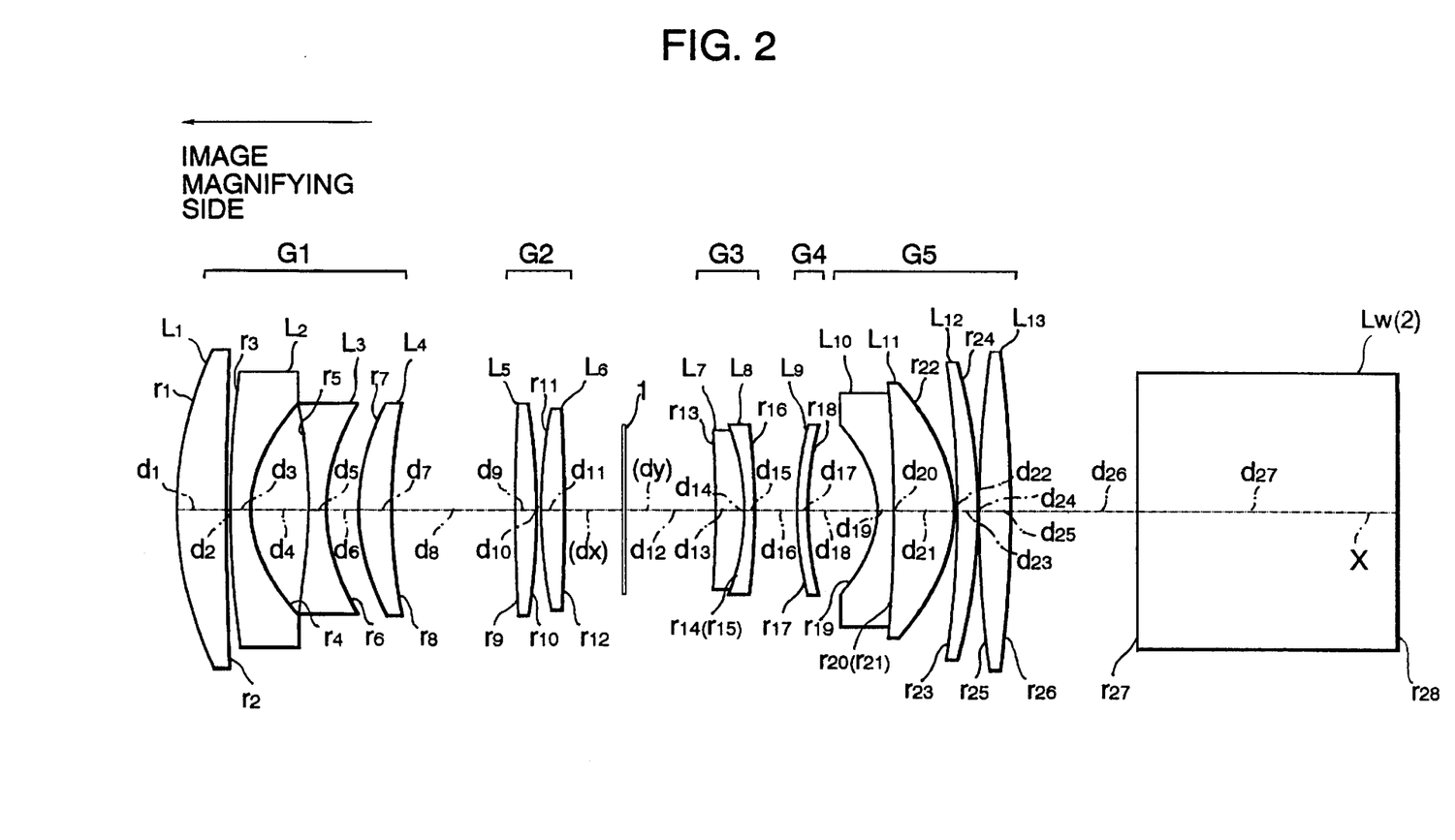
FIG. 2 is a diagrammatic side view of the zoom lens of FIG. 1, which is at a wide-angle end.
Figure 3:
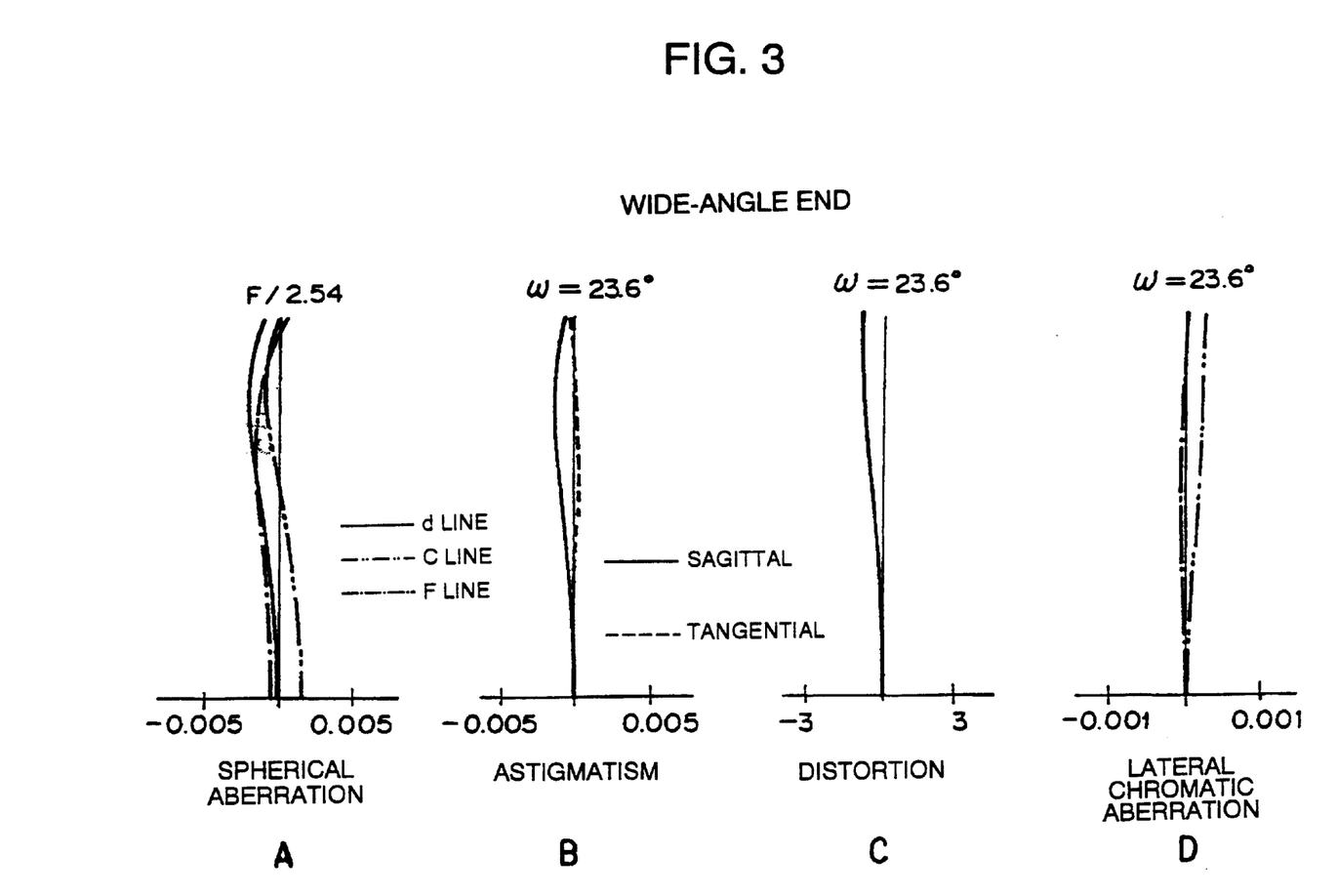
FIGS. 3A–3D are graphical views showing curves of spherical aberrations for d, C and F spectral lines, astigmatism in sagittal and tangential planes, distortion, and lateral chromatic aberrations of a zoom lens in accordance with a first embodiment of the invention, which is at a wide-angle end.
Figure 4:
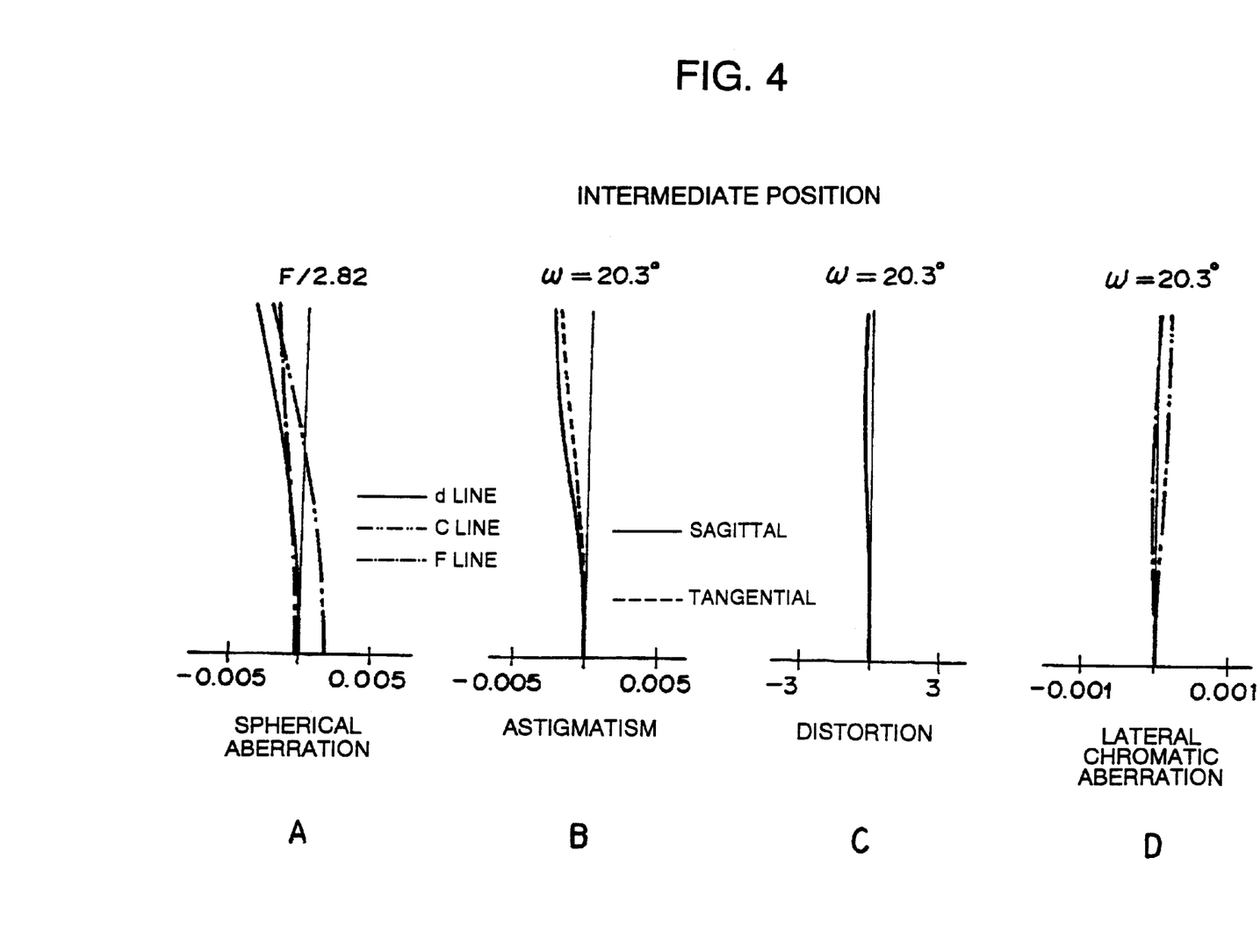
FIGS. 4A–4D are graphical views showing curves of spherical aberrations for d, C and F spectral lines, astigmatism in sagittal and tangential planes, distortion, and lateral chromatic aberrations of the zoom lens in accordance with the first embodiment of the invention, which is in an intermediate position.
Figure 5:
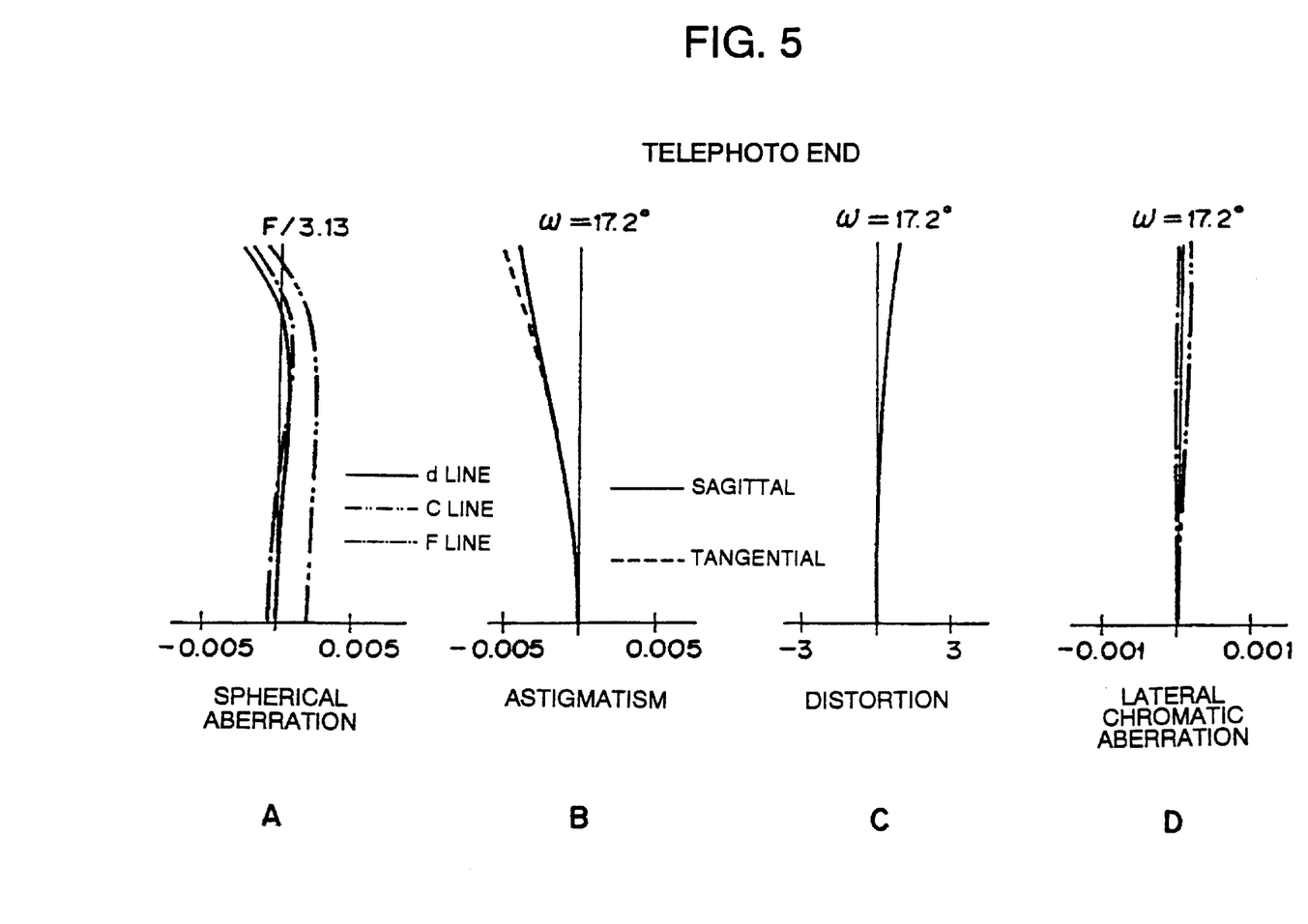
FIGS. 5A–5D are graphical views showing curves of spherical aberrations for d, C and F spectral lines, astigmatism in sagittal and tangential planes, distortion, and lateral chromatic aberrations of the zoom lens in accordance with the first embodiment of the invention, which is at a telephoto end.
Figure 6:
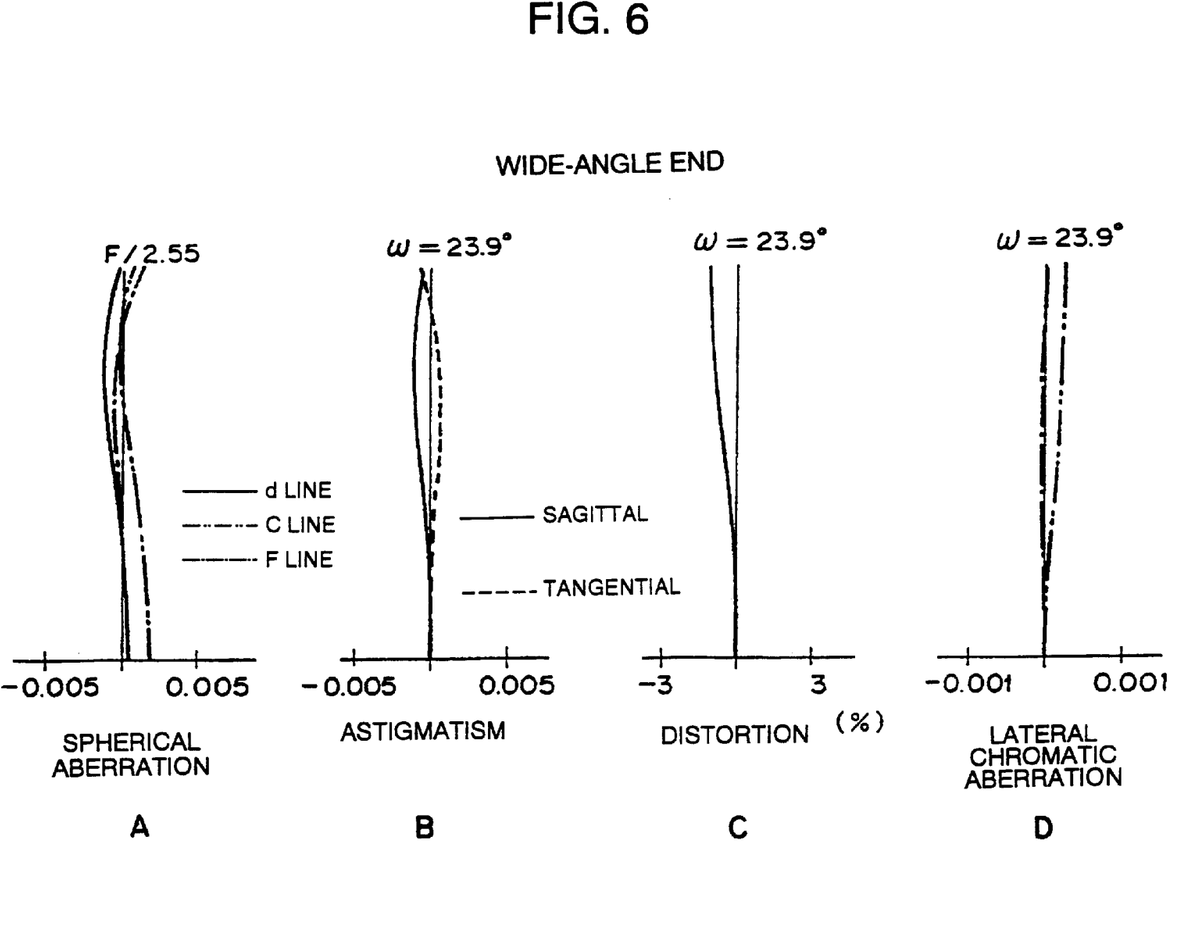
FIGS. 6A–6D are graphical views showing curves of spherical aberrations for d, C and F spectral lines, astigmatism in sagittal and tangential planes, distortion, and lateral chromatic aberrations of a zoom lens in accordance with a second embodiment of the invention, which is at a wide-angle end.
Figure 7:
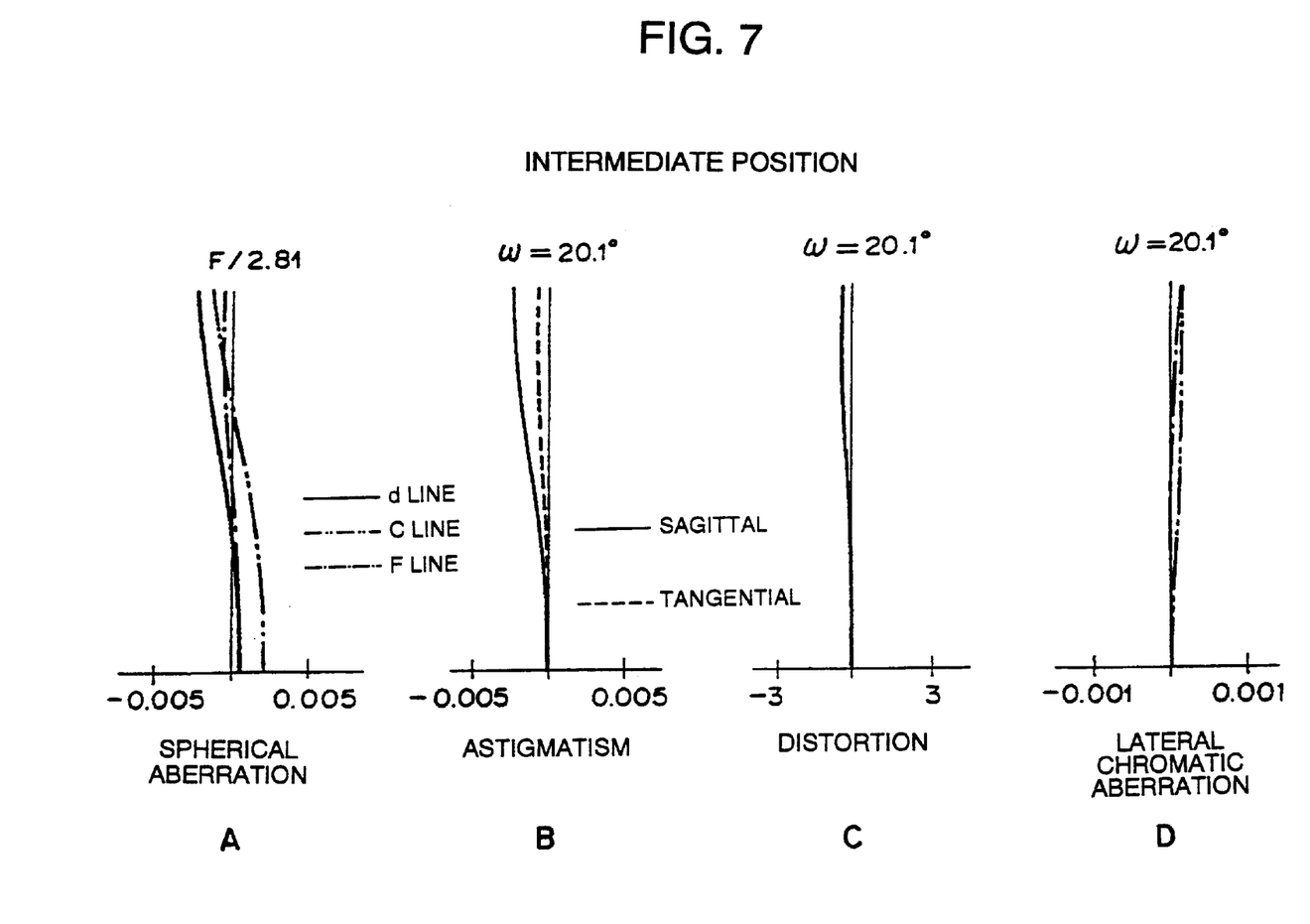
FIGS. 7A–7D are graphical views showing curves of spherical aberrations for d, C and F spectral lines, astigmatism in sagittal and tangential planes, distortion, and lateral chromatic aberrations of the zoom lens in accordance with the second embodiment of the invention, which is in an intermediate position.
Figure 8:
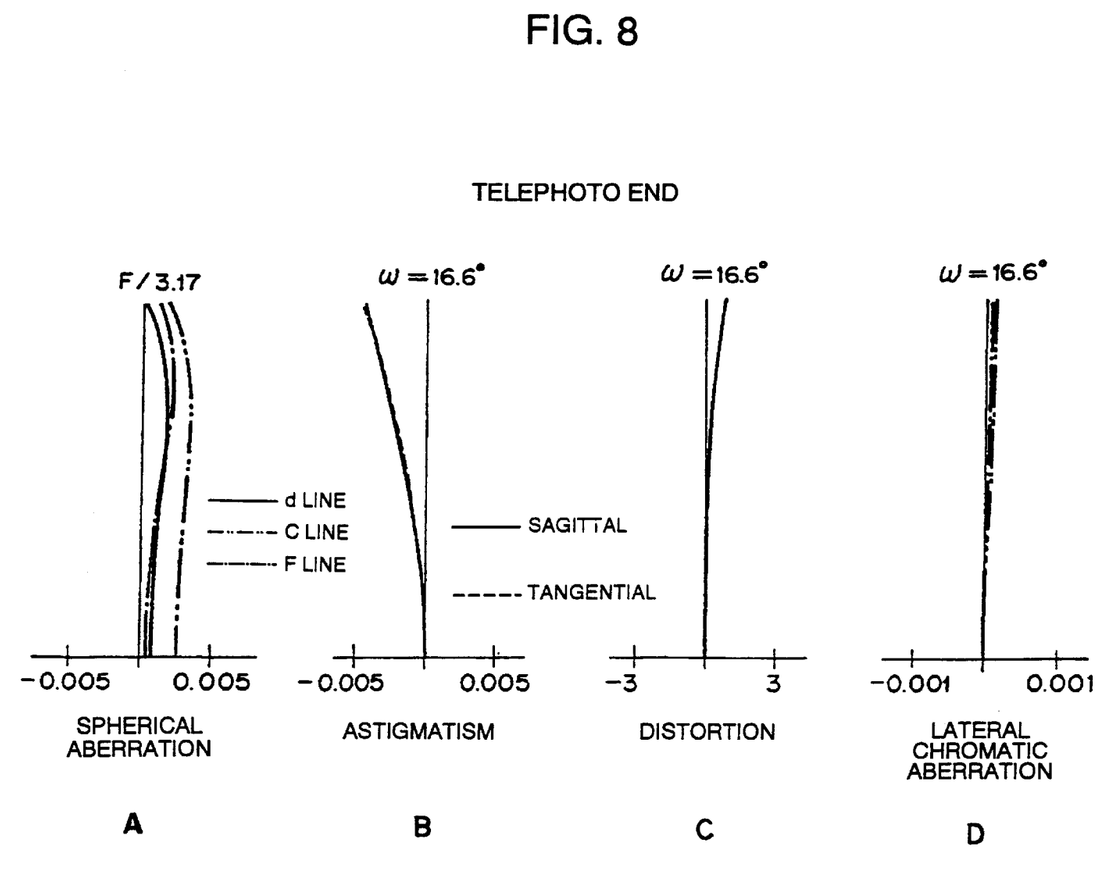
FIGS. 8A–8D are graphical views showing curves of spherical aberrations for d, C and F spectral lines, astigmatism in sagittal and tangential planes, distortion, and lateral chromatic aberrations of the zoom lens in accordance with the second embodiment of the invention, which is at a telephoto end.
Figure 9:
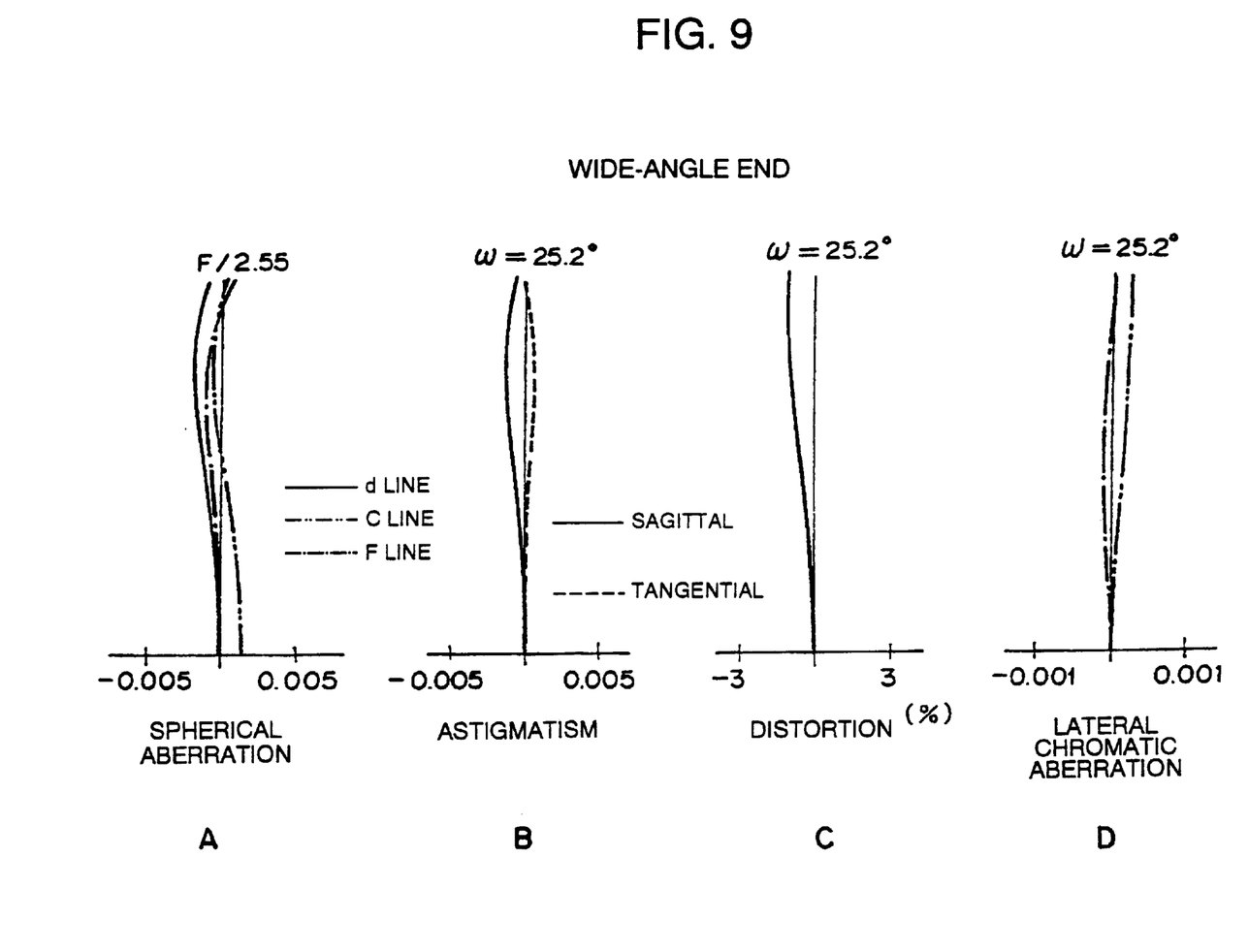
FIGS. 9A–9D are graphical views showing curves of spherical aberrations for d, C and F spectral lines, astigmatism in sagittal and tangential planes, distortion, and lateral chromatic aberrations of the zoom lens in accordance with a third embodiment of the invention, which is in a wide-angle position.
Figure 10:
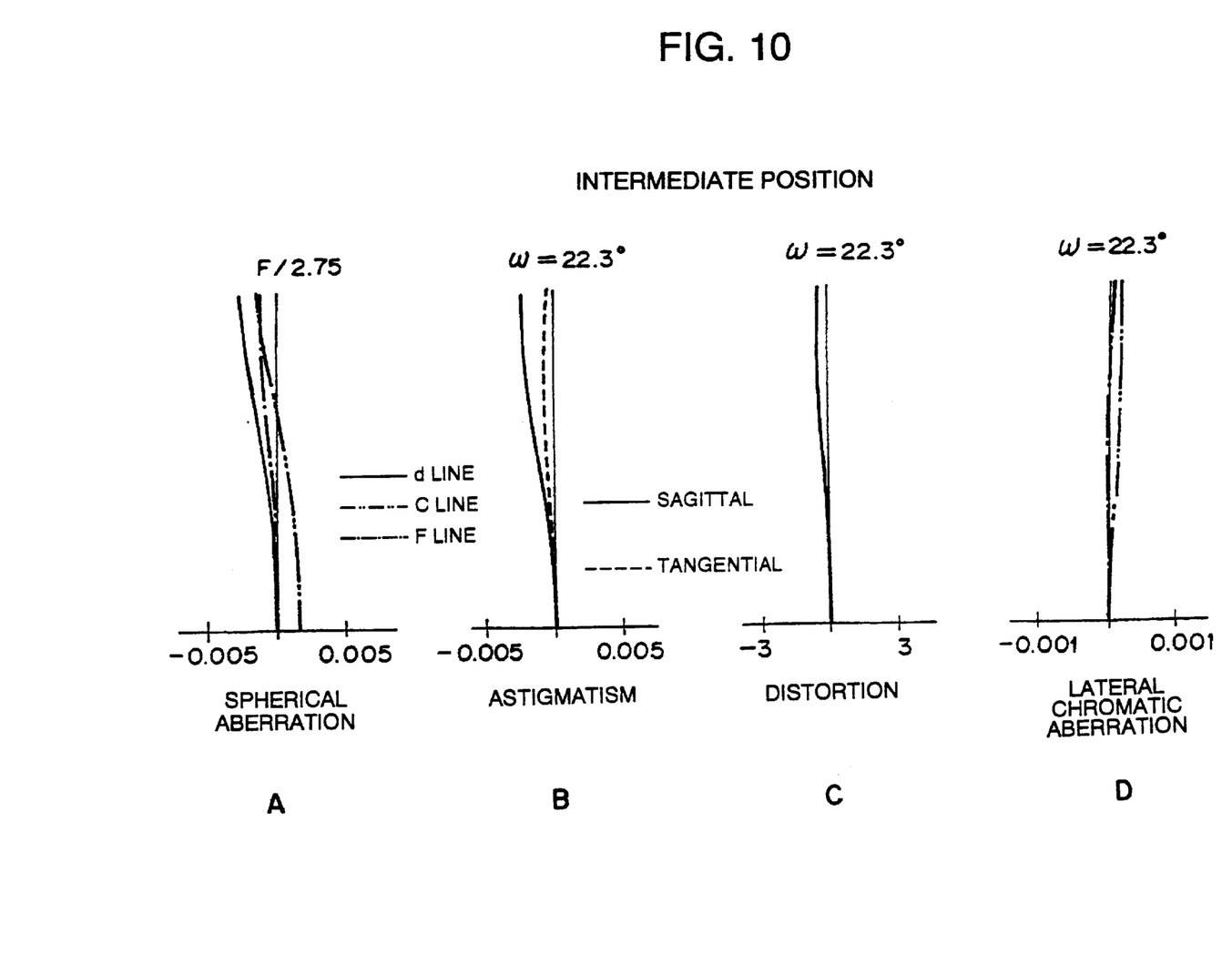
FIGS. 10A–10D are graphical views showing curves of spherical aberrations for d, C and F spectral lines, astigmatism in sagittal and tangential planes, distortion, and lateral chromatic aberrations of the zoom lens in accordance with the third embodiment of the invention, which is in an intermediate position.
Figure 11:
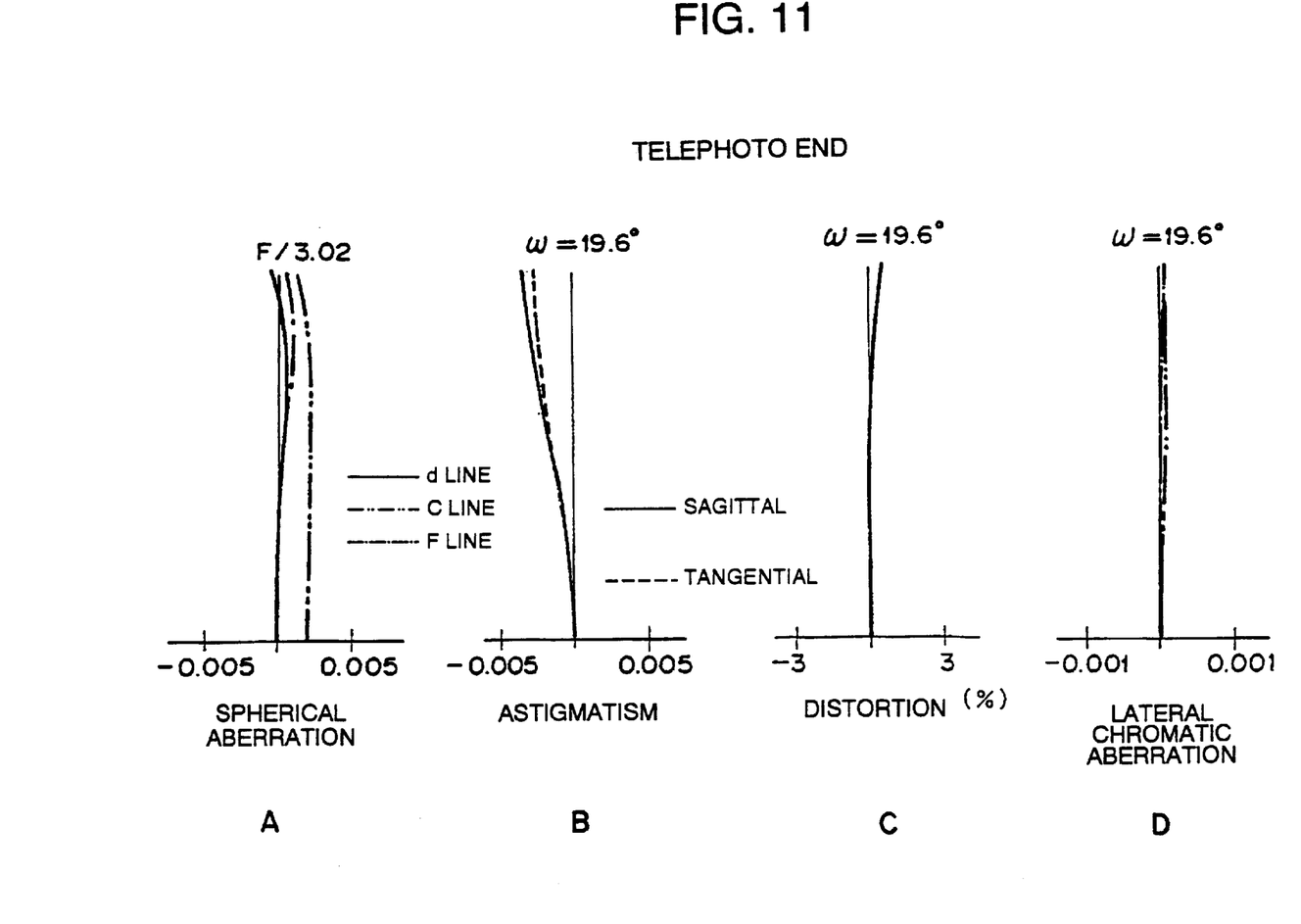
FIGS. 11A–11D are graphical views showing curves of spherical aberrations for d, C and F spectral lines, astigmatism in sagittal and tangential planes, distortion, and lateral chromatic aberrations of the zoom lens in accordance with the third embodiment of the invention, which is at a telephoto end.

Referring to the drawings in detail, in particular, to FIGS. 1 and 2 schematically showing a zoom lens according to the invention, the zoom lens comprises five lens groups, namely a negative power first lens group G1, a positive power second lens group G2, a positive power third lens group G3, a negative power fourth lens group G4 and a positive power fifth lens group G5 arranged along an optical axis X in this order from the image magnifying side. The first lens group G1 is moved axially for focusing the optical system and, however, remains fixed during zooming the optical system. The three lens groups, second to fourth lens groups G2 to G4, are moved relative to each other and relative to the lens group G5 which is always stationary during zooming and focusing.

The zoom lens is provided with a diaphragm 1 which is disposed between the second and third lens groups G2 and G3 and moves either together with the second lens group G2 or together with the third lens group G3 during zooming the lens system. On the image reducing side, the zoom lens incorporates a color composing dichroic prism $2(L_w)$.

As shown in FIG. 2, the zoom lens includes, in order from the image magnifying side to the image reducing side, first to fourth lens elements, namely a positive power first lens element $L_1$, a negative power second lens element $L_2$, a negative power lens element $L_3$ and a positive power fourth lens element $L_4$ for the first lens group G1, fifth and sixth lens elements, namely a positive power fifth lens element $L_5$ and a positive power sixth lens element $L_6$ for the second lens group G2, seventh and eighth lens elements, namely a positive power lens element $L_7$ and a negative power eighth lens element $L_8$ for the third lens group G3, a negative power ninth lens element $L_9$. for the fourth lens group G4 and tenth to thirteenth lens elements, namely a negative power tenth lens element $L_{10}$, a positive power eleventh lens element $L_{11}$, a positive power twelfth lens element $L_{12}$ and a positive power thirteenth lens element $L_{13}$ for the fifth lens group G5.

The zoom lens shown in FIG. 2 is designed and adapted to satisfy the following conditions:

$$-2.0 < F_1/F < -0.9 \ldots \quad (I)$$

$$0.9 < F_2/F < 1.5 \ldots \quad (II)$$

$$1.5 < F_3/F < 5.0 \ldots \quad (III)$$

$$0.8 < F_5/F < 1.5 \ldots \quad (IV)$$

$$0.1 < D_2/F < 0.5 \ldots \quad (V)$$

$$0.08 < \delta D_2/F < 0.3 \ldots \quad (VI)$$

$$\underline{v}(-) < 30 \ldots \quad (VII)$$

where F is the overall focal length of the zoom lens at the wide angle end;

$F_1$, $F_2$, $F_3$ and $F_5$ are the focal lengths of the first, second, third and fifth lens groups G1, G2, G3 and G5, respectively;

$D_2$ is the axial distance between the second and third lens groups G2 and G3 of the zoom lens at the wide-angle end;

$\delta D_2$ is the absolute value of a change in the axial distance between the second and third lens groups G3 during zooming the lens system from the wide-angle end to the telephoto end; and $\underline{v}(-)$ is the dispersion of the negative power lens element as measured by the Abbe number.

The following description will be directed to various zoom lenses embodying the present invention.

In the following tables, various embodiments of the invention are set forth for various equivalent focal length ranges, with parameters of the invention. In the following prescription tables, the reference L followed by an Arabic numeral indicates the lens element progressively from the subject end to the image end of the infrared zoom lens. The reference radius numbers $\underline{r}$ are the progressive lens surface radii. Positive surface radii are struck from the right of the lens surface on the optical axis X. Negative surface radii are struck from the left of the lens surface on the optical axis X. N is the index of refraction of the lens elements. These radius and distance are standardized by the focal length of the zoom lens. $\underline{v}$ is the dispersion of the negative power lens element as measured by the Abbe number. The reference distance numbers $\underline{d}$ are the progressive axial optical distances between adjacent surfaces. The spaces D are spaces between lens groups which vary with changes in equivalent focal length (EFL).

A zoom lens according to a first embodiment of the invention, the first lens group G1 includes first to fourth lens elements, namely a positive power meniscus first lens element $L_1$ having a convex surface at the image magnifying side, a negative power meniscus second lens element $L_2$ having a convex surface at the image magnifying side, a negative power bi-concave third lens element $L_3$ having a strong curvature of reducing side surface and a positive power meniscus fourth lens element $L_4$ having a convex surface at the image magnifying side. The second lens group G2 includes fifth and sixth lens elements, namely a bi-convex fifth lens element $L_5$ having a strong curvature of reducing side surface and a positive power meniscus sixth lens element $L_6$ having a convex surface at the image magnifying side. The third lens group G3 is a positive doublet or separeted seventh and eighth lens elements, namely a positive power meniscus seventh lens element $L_7$ having a convex surface at the image reducing side and a negative power meniscus eighth lens element $L_8$ having a convex surface at the image reducing side. The fourth lens group G4 comprises a single element comprising a negative power meniscus ninth lens element $L_9$ having a convex surface at the image magnifying side. The fifth lens group G5 includes four elements, namely a negative power meniscus tenth lens element $L_{10}$ having a convex surface at the image reducing side, a positive power meniscus eleventh lens element $L_{11}$ having a convex surface at the image reducing side, a positive power meniscus twelfth lens element $L_{12}$ having a convex surface at the image reducing side and a positive power bi-convex thirteenth lens element $L_{13}$ having a strong curvature of magnifying side surface. The diaphragm 1 is disposed at a fixed distance (dy) of 0.31164 from the third lens group G3 and moves together with the third lens group G3 during zooming the lens system. On the image reducing side, the zoom lens incorporates a color composing dichroic prism 2.

The zoom lens according to the first embodiment of the invention is substantially described in Table I.

TABLE I

| Element | Radius of Curvature | | Optical Distance Between Surfaces | | N | $\underline{v}$ |
|---|---|---|---|---|---|---|
| $L_1$ | $r_1 =$ | 1.1021 | $d_1 =$ | 0.18787 | 1.51680 | 64.2 |
|  | $r_2 =$ | 38.3647 | $d_2 =$ | 0.00536 |  |  |
| $L_2$ | $r_3 =$ | 5.0385 | $d_3 =$ | 0.07697 | 1.58144 | 40.9 |
|  | $r_4 =$ | 0.5989 | $d_4 =$ | 0.19372 |  |  |
| $L_3$ | $r_5 =$ | −2.6629 | $d_5 =$ | 0.04881 | 1.49700 | 81.6 |
|  | $r_6 =$ | 0.7502 | $d_6 =$ | 0.13840 |  |  |
| $L_4$ | $r_7 =$ | 0.9125 | $d_7 =$ | 0.07646 | 1.84666 | 23.8 |
|  | $r_8 =$ | 1.5435 | $d_8 =$ | D1 |  |  |
| $L_5$ | $r_9 =$ | 8.1098 | $d_9 =$ | 0.07462 | 1.74330 | 49.2 |
|  | $r_{10} =$ | −2.3253 | $d_{10} =$ | 0.00563 |  |  |
| $L_6$ | $r_{11} =$ | 1.6822 | $d_{11} =$ | 0.06794 | 1.71300 | 53.9 |
|  | $r_{12} =$ | 51.6260 | $d_{12} =$ | D2 (dx + 0.31164) |  |  |
| $L_7$ | $r_{13} =$ | −4.5885 | $d_{13} =$ | 0.09928 | 1.65844 | 50.8 |
|  | $r_{14} =$ | −0.5298 | $d_{14} =$ | 0 |  |  |
| $L_8$ | $r_{15} =$ | −0.5298 | $d_{15} =$ | 0.04506 | 1.84666 | 23.8 |
|  | $r_{16} =$ | −1.0245 | $d_{16} =$ | D3 |  |  |
| $L_9$ | $r_{17} =$ | 1.1503 | $d_{17} =$ | 0.03755 | 1.78472 | 25.7 |
|  | $r_{18} =$ | 0.7149 | $d_{18} =$ | D4 |  |  |
| $L_{10}$ | $r_{19} =$ | −0.4630 | $d_{19} =$ | 0.04881 | 1.78472 | 25.7 |
|  | $r_{20} =$ | −6.2404 | $d_{20} =$ | 0 |  |  |
| $L_{11}$ | $r_{21} =$ | −6.2404 | $d_{21} =$ | 0.19724 | 1.71300 | 53.9 |
|  | $r_{22} =$ | −0.6230 | $d_{22} =$ | 0.00536 |  |  |
| $L_{12}$ | $r_{23} =$ | −5.2543 | $d_{23} =$ | 0.08069 | 1.51680 | 64.2 |
|  | $r_{24} =$ | −1.8611 | $d_{24} =$ | 0.00563 |  |  |
| $L_{13}$ | $r_{25} =$ | 2.9431 | $d_{25} =$ | 0.14215 | 1.84666 | 23.8 |
|  | $r_{26} =$ | −2.4311 | $d_{26} =$ | 0.43637 |  |  |
|  | $r_{27} =$ | ∞ |  |  |  |  |

TABLE I-continued

| Element | Radius of Curvature | Optical Distance Between Surfaces | N | $\nu$ |
|---|---|---|---|---|
| $L_W$ | | $d_{27}$ = 0.88911 | 1.51633 | 64.1 |
| | $r_{28}$ = ∞ | | | |

Zoom Spacing

| | D1 | D2 | D3 | D4 |
|---|---|---|---|---|
| WAE | 0.39616 | 0.52967 | 0.14005 | 0.22253 |
| INT | 0.22796 | 0.47294 | 0.26279 | 0.32472 |
| TPE | 0.06659 | 0.40446 | 0.43604 | 0.38132 |

Zoom lens described in prescription Table I has the parameters as follows:

| $F_1/F$ | $F_2/F$ | $F_3/F$ | $F_5/F$ | $D_2/F$ | $\delta D_2/F$ | $\nu(-)$ |
|---|---|---|---|---|---|---|
| −1.38 | 1.12 | 2.93 | 1.32 | 0.22 | 0.13 | 23.8 |

As apparent, the zoom lens described in prescription Table I satisfies the conditions (I)–(VII).

Spherical aberrations for spectral line d, C and F, astigmatism in sagittal and tangential planes, distortion, and lateral chromatic aberrations for spectral lines of the zoom lens in the wide-angle end (WAE) position, the intermediate (INT) position and the tele-photo end (TPE) position are shown in FIGS. 3A–3D, 4A–4D and 5A–5D, respectively. As apparent from FIGS. 3A–3D, 4A–4D and 5A–5D, the zoom lens has well balanced aberrations over the range of zoom ratios. While the zoom lens maintains compactness for a relatively large image size, it provides a back focal length suitably long for an optical element, such as a dichroic prism of a projection type television set, disposed at the back thereof. Furthermore, the zoom lens makes light rays in a tangential surface at the image reducing side approximately parallel to and symmetrical with respect to the optical axis.

A zoom lens according to a second embodiment of the invention has an optical system similar to that of the first embodiment excepting that a twelfth lens element $L_{12}$ of the fifth lens group G5 consists of a bi-convex lens having a strong curvature at the image reducing side and the diaphragm 1 is disposed at a fixed distance (dx) of 0.20680 from the second lens group G2 and moves together with the second lens group G2 during zooming the lens system.

The zoom lens according to the second embodiment of the invention is substantially described in Table II.

TABLE II

| Element | Radius of Curvature | Optical Distance Between Surfaces | N | $\nu$ |
|---|---|---|---|---|
| $L_1$ | $r_1$ = 1.1923 | $d_1$ = 0.20745 | 1.51680 | 64.2 |
| | $r_2$ = 40.7319 | $d_2$ = 0.00591 | | |
| $L_2$ | $r_3$ = 5.1270 | $d_3$ = 0.08075 | 1.59551 | 39.2 |
| | $r_4$ = 0.6505 | $d_4$ = 0.20053 | | |
| | $r_5$ = −3.1903 | | | |

TABLE II-continued

| Element | Radius of Curvature | Optical Distance Between Surfaces | N | $\nu$ |
|---|---|---|---|---|
| $L_3$ | $r_6$ = 0.8020 | $d_5$ = 0.05121 | 1.49700 | 81.6 |
| | $r_7$ = 0.9387 | $d_6$ = 0.13825 | | |
| $L_4$ | $r_8$ = 1.5018 | $d_7$ = 0.07949 | 1.84666 | 23.8 |
| | $r_9$ = 10.4141 | $d_8$ = D1 | | |
| $L_5$ | $r_{10}$ = −2.3939 | $d_9$ = 0.07732 | 1.74330 | 49.2 |
| | $r_{11}$ = 1.6036 | $d_{10}$ = 0.00589 | | |
| $L_6$ | $r_{12}$ = 22.0389 | $d_{11}$ = 0.07285 | 1.71300 | 53.9 |
| | $r_{13}$ = −3.1039 | $d_{12}$ = D2 (0.20680 + dy) | | |
| $L_7$ | $r_{14}$ = −0.5290 | $d_{13}$ = 0.09933 | 1.70154 | 41.1 |
| | $r_{15}$ = −0.5290 | $d_{14}$ = 0 | | |
| $L_8$ | $r_{16}$ = −1.1107 | $d_{15}$ = 0.04727 | 1.84666 | 23.8 |
| | $r_{17}$ = 1.2369 | $d_{16}$ = D3 | | |
| $L_9$ | $r_{18}$ = 0.7618 | $d_{17}$ = 0.04530 | 1.80518 | 25.5 |
| | $r_{19}$ = −0.4948 | $d_{18}$ = D4 | | |
| $L_{10}$ | $r_{20}$ = −9.2568 | $d_{19}$ = 0.05121 | 1.78472 | 25.7 |
| | $r_{21}$ = −9.2568 | $d_{20}$ = 0 | | |
| $L_{11}$ | $r_{22}$ = −0.6645 | $d_{21}$ = 0.21183 | 1.71300 | 53.9 |
| | $r_{23}$ = 8.8420 | $d_{22}$ = 0.00591 | | |
| $L_{12}$ | $r_{24}$ = −2.8682 | $d_{23}$ = 0.10399 | 1.62041 | 60.4 |
| | $r_{25}$ = 4.2141 | $d_{24}$ = 0.00591 | | |
| $L_{13}$ | $r_{26}$ = −2.6357 | $d_{25}$ = 0.13326 | 1.84666 | 23.8 |
| | $r_{27}$ = ∞ | $d_{26}$ = 0.48672 | | |
| $L_W$ | $r_{28}$ = ∞ | $d_{27}$ = 0.93276 | 1.51633 | 64.1 |

Zoom Spacing

| | D1 | D2 | D3 | D4 |
|---|---|---|---|---|
| WAE | 0.48683 | 0.60634 | 0.05073 | 0.23701 |
| INT | 0.27472 | 0.51766 | 0.23602 | 0.35252 |
| TPE | 0.07963 | 0.40721 | 0.48808 | 0.40600 |

Zoom lens described in prescription Table II has the parameters as follows:

| $F_1/F$ | $F_2/F$ | $F_3/F$ | $F_5/F$ | $D_2/F$ | $\delta D_2/F$ | $\nu(-)$ |
|---|---|---|---|---|---|---|
| −1.46 | 1.26 | 3.62 | 1.32 | 0.34 | 0.20 | 23.8 |

As apparent, the zoom lens described in prescription Table II satisfies the conditions (I)–(VII).

Spherical aberrations for spectral line d, C and F, astigmatism in sagittal and tangential planes, distortion, and lateral chromatic aberrations for spectral lines of the zoom lens in the wide-angle end (WAE) position, the intermediate (INT) position and the telephoto end (TPE) position are shown in FIGS. 6A–6D, 7A–7D and 8A–8D, respectively. As apparent from FIGS. 6A–6D, 7A–7D and 8A–8D, the zoom lens has well balanced aberrations over the range of zoom ratios. While the zoom lens maintains compactness for a relatively large image size, it provides a back focal length suitably long for an optical element, such as a dichroic prism of a projection type television set, disposed at the back thereof. Furthermore, the zoom lens makes light rays in a tangential surface at the image reducing side approximately parallel to and symmetrical with respect to the optical axis.

A zoom lens according to a third embodiment of the invention has an optical system similar to that of the first embodiment excepting that a tenth lens element $L_{10}$ and a eleventh lens element $L_{11}$ of the fifth lens group G5 consists of a bi-concave lens having a strong curvature at the image magnifying side and a bi-convex lens having a strong curvature at the image reducing side, respectively, and the diaphragm 1 is disposed at a fixed distance (dx) of 0.33244 from the second lens group G2 and moves together with the second lens group G2 during zooming the lens system.

The zoom lens according to the third embodiment of the invention is substantially described in Table III.

TABLE III

| Element | Radius of Curvature | | Optical Distance Between Surfaces | N | ν |
|---|---|---|---|---|---|
| $L_1$ | $r_1 =$ | 1.2446 | $d_1 =$ 0.21800 | 1.51680 | 64.2 |
|  | $r_2 =$ | 32.2718 | $d_2 =$ 0.00589 |  |  |
| $L_2$ | $r_3 =$ | 4.3266 | $d_3 =$ 0.08018 | 1.70154 | 41.1 |
|  | $r_4 =$ | 0.6482 | $d_4 =$ 0.23409 |  |  |
| $L_3$ | $r_5 =$ | −2.3634 | $d_5 =$ 0.05475 | 1.49700 | 81.6 |
|  | $r_6 =$ | 0.8952 | $d_6 =$ 0.11344 |  |  |
| $L_4$ | $r_7 =$ | 1.0400 | $d_7 =$ 0.08605 | 1.84666 | 23.8 |
|  | $r_8 =$ | 1.8296 | $d_8 =$ D1 |  |  |
| $L_5$ | $r_9 =$ | 19.5211 | $d_9 =$ 0.08769 | 1.74330 | 49.2 |
|  | $r_{10} =$ | −2.1880 | $d_{10} =$ 0.00589 |  |  |
| $L_6$ | $r_{11} =$ | 1.6849 | $d_{11} =$ 0.08460 | 1.71300 | 53.9 |
|  | $r_{12} =$ | 229.7953 | $d_{12} =$ D2 (0.33244 + dy) |  |  |
| $L_7$ | $r_{13} =$ | −11.4184 | $d_{13} =$ 0.10357 | 1.66672 | 48.3 |
|  | $r_{14} =$ | −0.5906 | $d_{14} =$ 0 |  |  |
| $L_8$ | $r_{15} =$ | −0.5906 | $d_{15} =$ 0.04693 | 1.84666 | 23.8 |
|  | $r_{16} =$ | −1.1471 | $d_{16} =$ D3 |  |  |
| $L_9$ | $r_{17} =$ | 1.1550 | $d_{17} =$ 0.04693 | 1.78472 | 25.7 |
|  | $r_{18} =$ | 0.7215 | $d_{18} =$ D4 |  |  |
| $L_{10}$ | $r_{19} =$ | −0.4696 | $d_{19} =$ 0.05475 | 1.78472 | 25.7 |
|  | $r_{20} =$ | 8.1848 | $d_{20} =$ 0 |  |  |
| $L_{11}$ | $r_{21} =$ | 8.1848 | $d_{21} =$ 0.21733 | 1.71300 | 53.9 |
|  | $r_{22} =$ | −0.6579 | $d_{22} =$ 0.00587 |  |  |
| $L_{12}$ | $r_{23} =$ | −19.4137 | $d_{23} =$ 0.08058 | 1.62041 | 60.4 |
|  | $r_{24} =$ | −2.7318 | $d_{24} =$ 0.00587 |  |  |

TABLE III-continued

| Element | Radius of Curvature | | Optical Distance Between Surfaces | N | ν |
|---|---|---|---|---|---|
| $L_{13}$ | $r_{25} =$ | 3.9431 | $d_{25} =$ 0.15105 | 1.84666 | 23.8 |
|  | $r_{26} =$ | −1.9859 | $d_{26} =$ 0.47502 |  |  |
| $L_W$ | $r_{27} =$ | ∞ | $d_{27} =$ 0.92418 | 1.51633 | 64.1 |
|  | $r_{28} =$ | ∞ |  |  |  |

Zoom Spacing

|  | D1 | D2 | D3 | D4 |
|---|---|---|---|---|
| WAE | 0.35253 | 0.62493 | 0.15139 | 0.25161 |
| INT | 0.21818 | 0.56766 | 0.28506 | 0.30957 |
| TPE | 0.09516 | 0.50229 | 0.45030 | 0.33272 |

Zoom lens described in prescription Table III has the parameters as follows:

| $F_1/F$ | $F_2/F$ | $F_{3IF}$ | $F_5/F$ | $D2/F$ | $\delta D_2/F$ | $\nu(-)$ |
|---|---|---|---|---|---|---|
| −1.23 | 1.26 | 2.61 | 1.32 | 0.29 | 0.12 | 23.8 |

As apparent, the zoom lens described in prescription Table III satisfies the conditions (I)–(VII).

Spherical aberrations for spectral line d, C and F, astigmatism in sagittal and tangential planes, distortion, and lateral chromatic aberrations for spectral lines of the zoom lens in the wide-angle end (WAE) position, the intermediate (INT) position and the tele-photo end (TPE) position are shown in FIGS. 9A–9D, 10A–10D and 11A–11D, respectively. As apparent from FIGS. 9A–9D, 10A–10D and 11A–11D, the zoom lens has well balanced aberrations over the range of zoom ratios. While the zoom lens maintains compactness for a relatively large image size, it provides a back focal length suitably long for an optical element, such as a dichroic prism of a projection type television set, disposed at the back thereof.. Furthermore, the zoom lens makes light rays in a tangential surface at the image reducing side approximately parallel to and symmetrical with respect to the optical axis.

It is to be understood that the present invention may be embodied with various changes, modifications and improvements, which may occur to those skilled in the art, without departing from the spirit and scope of the invention defined in the following claims.

What is claimed is:

1. A zoom lens comprising, in order from the image magnifying side to the image reducing side, a negative power first lens group which is moved axially for focusing a lens system of the zoom lens and fixed during zooming the lens system, a positive power second lens group, a positive power third lens group and a negative power fourth lens group which are moved axially relative to each other and relative to the first lens group and a fifth lens group which has a positive power and remains fixed during focusing and zooming the lens system, said zoom lens satisfying the following conditions:

$-2.0 < F_1/F < -0.9$ $0.9 < F_2/F < 1.5$ $1.5 < F_3/F < 5.0$ $0.8 < F_5/F < 1.5$ where F is the overall focal length of the zoom lens at the wide angle end, and F1, F2, F3 and F5 are the focal lengths of the first, second, third and fifth lens groups, respectively.

2. The zoom lens as defined in claim 1, wherein said second and third group lenses move axially to change an axial distance therebetween shorter during changing the focal length from a wide-angle end to a telephoto end.

3. The zoom lens as defined in claim 1, wherein said second and third lens groups satisfies the following conditions:

$0.1 < D_2/F < 0.5$ $0.08 < \delta D_2 F < 0.3$ where $D_2$ is the axial distance between the second and third lens groups of the zoom lens at the wide-angle end and $\delta D_2$ is an absolute value of a change in the axial distance between the second and third lens groups during changing the focal length from a wide-angle end to a telephoto end.

4. The zoom lens as defined in claim 3, and further comprising a diaphragm disposed between said second and third lens groups, said diaphragm being moved together with one of the second and third lens groups during zooming.

5. The zoom lens as defined in claim 3, wherein said third lens group consisting of a positive power lens element and a negative power lens element and satisfies the following conditions:

$\underline{v}(-) < 30$ where $\underline{v}(-)$ is the dispersion of said negative power lens element as measured by the Abbe number.

6. The zoom lens as defined in claim 4, wherein said zoom lens includes, in order from the image magnifying side to the image reducing side, a positive power first lens element $L_1$, a negative power second lens element $L_2$, a negative power lens element $L_3$ and a positive power fourth lens element $L_4$ for said first lens group, a positive power fifth lens element $L_5$ and a positive power sixth lens element $L_6$ for said second lens group, a positive power lens element $L_7$ and a negative power eighth lens element $L_8$ for said third lens group, a negative power ninth lens element $L_9$ for said fourth lens group, and a negative power tenth lens element $L_{10}$, a positive power eleventh lens element $L_{11}$, a positive power twelfth lens element $L_{12}$ and a positive power thirteenth lens element $L_{13}$ for said fifth lens group, and said diaphragm is disposed at a fixed axial distance of 0. 31164 from said third lens group and moved together with said third lens group during zooming, said zoom lens substantially as described:

| Element | Radius of Curvature | | Optical Distance Between Surfaces | | N | $\underline{v}$ |
|---|---|---|---|---|---|---|
| $L_1$ | $r_1 =$ | 1.1021 | $d_1 =$ | 0.18787 | 1.51680 | 64.2 |
| | $r_2 =$ | 38.3647 | $d_2 =$ | 0.00536 | | |
| $L_2$ | $r_3 =$ | 5.0385 | $d_3 =$ | 0.07697 | 1.58144 | 40.9 |
| | $r_4 =$ | 0.5989 | $d_4 =$ | 0.19372 | | |
| $L_3$ | $r_5 =$ | −2.6629 | $d_5 =$ | 0.04881 | 1.49700 | 81.6 |
| | $r_6 =$ | 0.7502 | | | | |

-continued

| Element | Radius of Curvature | | Optical Distance Between Surfaces | | N | $\underline{v}$ |
|---|---|---|---|---|---|---|
| | | | $d_6 =$ | 0.13840 | | |
| | $r_7 =$ | 0.9125 | | | | |
| $L_4$ | | | $d_7 =$ | 0.07646 | 1.84666 | 23.8 |
| | $r_8 =$ | 1.5435 | | | | |
| | | | $d_8 =$ | D1 | | |
| | $r_9 =$ | 8.1098 | | | | |
| $L_5$ | | | $d_9 =$ | 0.07462 | 1.74330 | 49.2 |
| | $r_{10} =$ | −2.3253 | | | | |
| | | | $d_{10} =$ | 0.00563 | | |
| | $r_{11} =$ | 1.6822 | | | | |
| $L_6$ | | | $d_{11} =$ | 0.06794 | 1.71300 | 53.9 |
| | $r_{12} =$ | 51.6260 | | | | |
| | | | $d_{12} =$ | D2 | | |
| | $r_{13} =$ | −4.5885 | | | | |
| $L_7$ | | | $d_{13} =$ | 0.09928 | 1.65844 | 50.8 |
| | $r_{14} =$ | −0.5298 | | | | |
| | | | $d_{14} =$ | 0 | | |
| | $r_{15} =$ | −0.5298 | | | | |
| $L_8$ | | | $d_{15} =$ | 0.04506 | 1.84666 | 23.8 |
| | $r_{16} =$ | −1.0245 | | | | |
| | | | $d_{16} =$ | D3 | | |
| | $r_{17} =$ | 1.1503 | | | | |
| $L_9$ | | | $d_{17} =$ | 0.03755 | 1.78472 | 25.7 |
| | $r_{18} =$ | 0.7149 | | | | |
| | | | $d_{18} =$ | D4 | | |
| | $r_{19} =$ | −0.4630 | | | | |
| $L_{10}$ | | | $d_{19} =$ | 0.04881 | 1.78472 | 25.7 |
| | $r_{20} =$ | −6.2404 | | | | |
| | | | $d_{20} =$ | 0 | | |
| | $r_{21} =$ | −6.2404 | | | | |
| $L_{11}$ | | | $d_{21} =$ | 0.19724 | 1.71300 | 53.9 |
| | $r_{22} =$ | −0.6230 | | | | |
| | | | $d_{22} =$ | 0.00536 | | |
| | $r_{23} =$ | −5.2543 | | | | |
| $L_{12}$ | | | $d_{23} =$ | 0.08069 | 1.51680 | 64.2 |
| | $r_{24} =$ | −1.8611 | | | | |
| | | | $d_{24} =$ | 0.00563 | | |
| | $r_{25} =$ | 2.9431 | | | | |
| $L_{12}$ | | | $d_{25} =$ | 0.14215 | 1.84666 | 23.8 |
| | $r_{26} =$ | −2.4311 | | | | |

| | Zoom Spacing | | | |
|---|---|---|---|---|
| | D1 | D2 | D3 | D4 |
| WAE | 0.39616 | 0.52967 | 0.14005 | 0.22253 |
| INT | 0.22796 | 0.47294 | 0.26279 | 0.32472 |
| TPE | 0.06659 | 0.40446 | 0.43604 | 0.38132 | where reference radius numbers $\underline{r}$ are the progressive lens surface radii standardized by the focal length of the zoom lens, reference distance numbers $\underline{d}$ are the progressive axial optical distances between adjacent surfaces standardized by the focal length of the zoom lens, $\underline{v}$ is dispersion as measured by the Abbe number, and zoom spaces D1 through D4 are spaces between lens groups which vary with changes in equivalent focal length.

7. The zoom lens as defined in claim 4, wherein said zoom lens includes, in order from the image magnifying side to the image reducing side, a positive power first lens element $L_1$, a negative power second lens element $L_2$, a negative power lens element $L_3$ and a positive power fourth lens element $L_4$ for said first lens group, a positive power fifth lens element $L_5$ and a positive power sixth lens element $L_6$ for said second lens group, a positive power lens element $L_7$ and a negative power eighth lens element $L_8$ for said third lens group, a negative power ninth lens element $L_9$ for said fourth lens group, and a negative power tenth lens element $L_{10}$ a positive power eleventh lens element $L_{11}$, a positive power twelfth lens element $L_{12}$ and a positive power thirteenth lens element $L_{13}$ for said fifth lens group, and said diaphragm is disposed at a fixed axial distance of 0.20680 from said second lens group and moved together with said second lens group during zooming, said zoom lens substantially as described:

| Element | Radius of Curvature | Optical Distance Between Surfaces | N | ν |
|---|---|---|---|---|
| $L_1$ | $r_1 =$ 1.1923 | $d_1 =$ 0.20745 | 1.51680 | 64.2 |
| | $r_2 =$ 40.7319 | $d_2 =$ 0.00591 | | |
| $L_2$ | $r_3 =$ 5.1270 | $d_3 =$ 0.08075 | 1.59551 | 39.2 |
| | $r_4 =$ 0.6505 | $d_4 =$ 0.20053 | | |
| $L_3$ | $r_5 =$ −3.1903 | $d_5 =$ 0.05121 | 1.49700 | 81.6 |
| | $r_6 =$ 0.8020 | $d_6 =$ 0.13825 | | |
| $L_4$ | $r_7 =$ 0.9387 | $d_7 =$ 0.07949 | 1.84666 | 23.8 |
| | $r_8 =$ 1.5018 | $d_8 =$ D1 | | |
| $L_5$ | $r_9 =$ 10.4141 | $d_9 =$ 0.07732 | 1.74330 | 49.2 |
| | $r_{10} =$ −2.3939 | $d_{10} =$ 0.00589 | | |
| $L_6$ | $r_{11} =$ 1.6036 | $d_{11} =$ 0.07285 | 1.71300 | 53.9 |
| | $r_{12} =$ 22.0389 | $d_{12} =$ D2 (0.20680 + dy) | | |
| $L_7$ | $r_{13} =$ −3.1039 | $d_{13} =$ 0.09933 | 1.70154 | 41.1 |
| | $r_{14} =$ −0.5290 | $d_{14} =$ 0 | | |
| $L_8$ | $r_{15} =$ −0.5290 | $d_{15} =$ 0.04727 | 1.84666 | 23.8 |
| | $r_{16} =$ −1.1107 | $d_{16} =$ D3 | | |
| $L_9$ | $r_{17} =$ 1.2369 | $d_{17} =$ 0.04530 | 1.80518 | 25.5 |
| | $r_{18} =$ 0.7618 | $d_{18} =$ D4 | | |
| $L_{10}$ | $r_{19} =$ −0.4948 | $d_{19} =$ 0.05121 | 1.78472 | 25.7 |
| | $r_{20} =$ −9.2568 | $d_{20} =$ 0 | | |
| $L_{11}$ | $r_{21} =$ −9.2568 | $d_{21} =$ 0.21183 | 1.71300 | 53.9 |
| | $r_{22} =$ −0.6645 | $d_{22} =$ 0.00591 | | |
| $L_{12}$ | $r_{23} =$ 8.8420 | $d_{23} =$ 0.10399 | 1.62041 | 60.4 |
| | $r_{24} =$ −2.8682 | $d_{24} =$ 0.00591 | | |
| $L_{13}$ | $r_{25} =$ 4.2141 | $d_{25} =$ 0.13326 | 1.84666 | 23.8 |
| | $r_{26} =$ −2.6357 | | | |

Zoom Spacing

| | D1 | D2 | D3 | D4 |
|---|---|---|---|---|
| WAE | 0.48683 | 0.60634 | 0.05073 | 0.23701 |
| INT | 0.27472 | 0.51766 | 0.23602 | 0.35252 |
| TPE | 0.07963 | 0.40721 | 0.48808 | 0.40600 | where reference radius numbers r are the progressive lens surface radii standardized by the focal length of the zoom lens, reference distance numbers d are the progressive axial optical distances between adjacent surfaces standardized by the focal length of the zoom lens, ν is dispersion as measured by the Abbe number, and zoom spaces D1 through D4 are spaces between lens groups which vary with changes in equivalent focal length.

8. The zoom lens as defined in claim 4, wherein said zoom lens includes, in order from the image magnifying side to the image reducing side, a positive power first lens element $L_1$, a negative power second lens element $L_2$, a negative power lens element $L_3$ and a positive power fourth lens element $L_4$ for said first lens group, a positive power fifth lens element $L_5$ and a positive power sixth lens element $L_6$ for said second lens group, a positive power lens element $L_7$ and a negative power eighth lens element $L_8$ for said third lens group, a negative power ninth lens element $L_9$ for said fourth lens group, and a negative power tenth lens element $L_{10}$, a positive power eleventh lens element $L_{11}$, a positive power twelfth lens element $L_{12}$ and a positive power thirteenth lens element $L_{13}$ for said fifth lens group, and said diaphragm is disposed at a fixed axial distance of 0.33244 from said second lens group and moved together with said second lens group during zooming, said zoom lens being substantially described:

| Element | Radius of Curvature | Optical Distance Between Surfaces | N | ν |
|---|---|---|---|---|
| $L_1$ | $r_1 =$ 1.2446 | $d_1 =$ 0.21800 | 1.51680 | 64.2 |
| | $r_2 =$ 32.2718 | $d_2 =$ 0.00589 | | |
| $L_2$ | $r_3 =$ 4.3266 | $d_3 =$ 0.08018 | 1.70154 | 41.1 |
| | $r_4 =$ 0.6482 | $d_4 =$ 0.23409 | | |
| $L_3$ | $r_5 =$ −2.3634 | $d_5 =$ 0.05475 | 1.49700 | 81.6 |
| | $r_6 =$ 0.8952 | $d_6 =$ 0.11344 | | |
| $L_4$ | $r_7 =$ 1.0400 | $d_7 =$ 0.08605 | 1.84666 | 23.8 |
| | $r_8 =$ 1.8296 | $d_8 =$ D1 | | |
| $L_5$ | $r_9 =$ 19.5211 | $d_9 =$ 0.08769 | 1.74330 | 49.2 |
| | $r_{10} =$ −2.1880 | $d_{10} =$ 0.00589 | | |
| $L_6$ | $r_{11} =$ 1.6849 | $d_{11} =$ 0.08460 | 1.71300 | 53.9 |
| | $r_{12} =$ 229.7953 | $d_{12} =$ D2 (0.33244 + dy) | | |
| $L_7$ | $r_{13} =$ −11.4184 | $d_{13} =$ 0.10357 | 1.66672 | 48.3 |
| | $r_{14} =$ −0.5906 | $d_{14} =$ 0 | | |
| $L_8$ | $r_{15} =$ −0.5906 | $d_{15} =$ 0.04693 | 1.84666 | 23.8 |
| | $r_{16} =$ −1.1471 | $d_{16} =$ D3 | | |
| $L_9$ | $r_{17} =$ 1.1550 | $d_{17} =$ 0.04693 | 1.78472 | 25.7 |
| | $r_{18} =$ 0.7215 | $d_{18} =$ D4 | | |
| $L_{10}$ | $r_{19} =$ −0.4696 | $d_{19} =$ 0.05475 | 1.78472 | 25.7 |
| | $r_{20} =$ 8.1848 | $d_{20} =$ 0 | | |
| $L_{11}$ | $r_{21} =$ 8.1848 | $d_{21} =$ 0.21733 | 1.71300 | 53.9 |
| | $r_{22} =$ −0.6579 | $d_{22} =$ 0.00587 | | |
| $L_{12}$ | $r_{23} =$ −19.4137 | $d_{23} =$ 0.08058 | 1.62041 | 60.4 |
| | $r_{24} =$ −2.7318 | $d_{24} =$ 0.00587 | | |
| $L_{13}$ | $r_{25} =$ 3.9431 | $d_{25} =$ 0.15105 | 1.84666 | 23.8 |
| | $r_{26} =$ −1.9859 | | | |

| Zoom Spacing | | | | |
|---|---|---|---|---|
| | D1 | D2 | D3 | D4 |
| WAE | 0.35253 | 0.62493 | 0.15139 | 0.25161 |
| INT | 0.21818 | 0.56766 | 0.28506 | 0.30957 |
| TPE | 0.09516 | 0.50229 | 0.45030 | 0.33272 | where reference radius numbers $r$ are the progressive lens surface radii standardized by the focal length of the zoom lens, reference distance numbers $d$ are the progressive axial optical distances between adjacent surfaces standardized by the focal length of the zoom lens, $v$ is dispersion as measured by the Abbe number, and zoom spaces D1 through D4 are spaces between lens groups which vary with changes in equivalent focal length.

9. A zoom lens comprising, in order from the image magnifying side to the image reducing side:

a negative power first lens group which is moved axially for focusing a lens system of the zoom lens and fixed during zooming the lens system, a positive power second lens group, a positive power third lens group, a negative power fourth lens group, and a fifth lens group which has a positive power and remains fixed during focusing and zooming the lens system, wherein each of the second, third, and fourth lens groups is adapted to move axially with respect to all others of the first, second, third, and fourth lens groups, and wherein said zoom lens satisfies the following conditions:

$$-2.0 < F_1/F < -0.9$$

$$0.9 < F_2/F < 1.5$$

$$1.5 < F_3/F < 5.0$$

$$0.8 < F_5/F < 1.5$$

where F is the overall focal length of the zoom lens at the wide angle end, and $F_1$, $F_2$, $F_3$, and $F_5$ are the focal lengths of the first, second, third and fifth lens groups, respectively.

* * * * *